(12) United States Patent
Metz et al.

(10) Patent No.: US 6,168,895 B1
(45) Date of Patent: *Jan. 2, 2001

(54) PIGMENT FOR ELECTROPHOTOGRAPHIC TONERS AND DEVELOPERS

(75) Inventors: Hans Joachim Metz, Darmstadt; Rüdiger Baur, Eppstein; Hans-Tobias Macholdt, Darmstadt-Eberstadt, all of (DE)

(73) Assignee: Clariant GmbH (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/876,964

(22) Filed: Jun. 17, 1997

Related U.S. Application Data

(63) Continuation-in-part of application No. 08/536,946, filed on Sep. 29, 1995, now abandoned.

(30) Foreign Application Priority Data

Oct. 5, 1994 (DE) .................................. 44 35 543

(51) Int. Cl.⁷ .................................................... G03G 9/09
(52) U.S. Cl. .......................... 430/106; 430/137; 524/106
(58) Field of Search ................................ 430/106, 137, 430/110; 534/797; 524/106

(56) References Cited

U.S. PATENT DOCUMENTS

| | | | |
|---|---|---|---|
| 3,970,601 | 7/1976 | Weber et al. | 260/77.5 |
| 3,974,136 | 8/1976 | Hunger et al. | 260/176 |
| 4,252,718 | 2/1981 | Atherton et al. | 260/207 |
| 4,298,672 | 11/1981 | Lu et al. | 430/108 |
| 4,795,690 | 1/1989 | Shindo et al. | 430/109 |
| 4,870,164 | 9/1989 | Kühne et al. | 534/742 |
| 4,920,205 | 4/1990 | Rehberg et al. | 534/582 |
| 4,935,502 * | 6/1990 | Kuhne et al. | 106/447 |
| 5,015,676 | 5/1991 | Macholdt et al. | 523/453 |
| 5,021,473 | 6/1991 | Macholdt et al. | 523/451 |
| 5,049,467 | 9/1991 | Yamanaka | 430/110 |
| 5,061,585 | 10/1991 | Macholdt et al. | 430/106 |
| 5,069,994 | 12/1991 | Gitzel et al. | 430/110 |
| 5,147,748 | 9/1992 | Gitzel et al. | 430/110 |
| 5,187,038 | 2/1993 | Gitzel et al. | 430/110 |
| 5,275,905 | 1/1994 | Ciccarelli et al. | 430/110 |
| 5,342,723 | 8/1994 | Macholdt et al. | 430/110 |
| 5,364,721 | 11/1994 | Asada | 430/109 |
| 5,378,571 | 1/1995 | Macholdt et al. | 430/110 |
| 5,401,809 | 3/1995 | Gitzel et al. | 525/337 |
| 5,453,151 | 9/1995 | Bäbler et al. | 106/497 |

FOREIGN PATENT DOCUMENTS

| | | |
|---|---|---|
| 2085809 | 6/1993 | (CA) . |
| 2132577 | 3/1995 | (CA) . |
| 40 29 652 | 3/1992 | (DE) . |
| 40 31 705 | 4/1992 | (DE) . |
| 41 42 541 | 6/1993 | (DE) . |
| 43 32 170 | 3/1995 | (DE) . |
| 0 024 702 | 3/1981 | (EP) . |
| 0 244 687 | 11/1987 | (EP) . |
| 0 258 651 | 3/1988 | (EP) . |
| 0 385 580 | 9/1990 | (EP) . |
| 0 516 434 | 12/1992 | (EP) . |
| 0 664 463 | 7/1995 | (EP) . |
| 705886 | 4/1996 | (EP) . |
| 2 214 730 | 8/1974 | (FR) . |
| 2 416 924 | 9/1979 | (FR) . |
| 6-266163 | 9/1994 | (JP) . |
| 7-53612 | 2/1995 | (JP) . |
| 91/10172 | 7/1991 | (WO) . |

OTHER PUBLICATIONS

Diamond, Arthur S. (editor) Handbook of Imaging Materials. New York: Marcel–Dekker, Inc. pp. 162–163, 1991.*
Database WPI, Section Ch, Week 9443, Derwent Publications Ltd., London, GB; Class A89, AN 94–344341, Japanese Patent No. 6266163.
Patent Abstracts of Japan, vol. 011, No. 097 (P–560), Mar. 26, 1987, Japanese Patent No. 61248059.
Diamond, Arthur S., editor, *Handbook of Imaging Materials*, Copyright 1991 Marcel Dekker, Inc. (pp. 163–170) 1991.
Chemical Abstracts, vol. 104, No. 14, Apr. 17, 1986, Columbus, Ohio Abstract No. 111362e.

* cited by examiner

*Primary Examiner*—Christopher D. Rodee
(74) *Attorney, Agent, or Firm*—Connolly Bove Lodge & Hutz LLP

(57) ABSTRACT

Azo pigment of the formula (1)

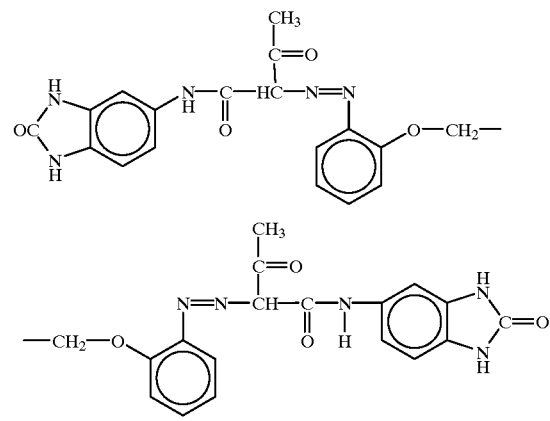

which has a specific surface area of the pigment powder of more than 45 $m^2/g$.

The azo pigment is particularly suitable as colorant in electrophotographic toners and devlopers, and in powder coatings and electret materials.

19 Claims, No Drawings

PIGMENT FOR ELECTROPHOTOGRAPHIC TONERS AND DEVELOPERS

This application is a continuation-in-part of Ser. No. 08/536,946 which was filed Sep. 29, 1995 now abandoned.

DESCRIPTION

Pigment for electrophotographic toners and developers

The present invention relates to an improved pigment based on C.I. Pigment Yellow 180 as a colorant in electrophotographic toners and developers.

In electrophotographic recording processes a "latent charge image" is produced on a photoconductor. This "latent charge image" is developed by applying an electrostatically charged toner, which is subsequently transferred to, for example, paper, textiles, films or plastic and is fixed, for example by means of pressure, radiation, heat or the effect of solvent. Typical toners are one- or two-component powder toners (also called one- or two-component developers), but use is also made of specialty toners, for example magnetic or liquid toners and polymerization toners (L. B. Schein, "Electrophotography and Development Physics"; Springer Series in Electrophysics 14; Springer-Verlag, 2nd edition, 1992).

One measure of the quality of the toner is its specific charge q/m (charge per unit mass). In addition to the sign and level of the electrostatic charge, the principal, decisive quality criteria are the rapid attainment of the desired charge level and the constancy of this charge over a prolonged activation period. In addition to this, the insensitivity of the toner to climatic effects such as temperature and atmospheric humidity is a further important criterion for its suitability.

Both positively and negatively chargeable toners are used in photocopiers, laser printers, LED (light-emitting diode) and LCS (liquid crystal shutter) printers or other digital printers based on electrophotographic techniques, depending on the type of process and type of apparatus.

To obtain electrophotographic toners or developers having either a positive or a negative charge, it is common to add charge control agents. The chromophoric component employed in color toners typically comprises organic color pigments. Color pigments have considerable advantages over dyes owing to their insolubility in the application medium, examples of these advantages being better thermal stability and lightfastness.

On the basis of the principle of subtractive color mixing the three primary colors, yellow, cyan and magenta, can be used to reproduce the entire color spectrum which is visible to the human eye. Exact color reproduction is possible only if the respective color meets the precisely defined color requirements. Otherwise, it is not possible to reproduce some shades, and the color contrast is inadequate.

In full-color toners, in addition to the precisely defined requirements in terms of color, the three toners yellow, cyan and magenta must also be matched exactly to one another in respect of their triboelectric properties, since they are transferred in succession in the same apparatus.

It is known that colorants may in some cases have a sustained effect on the triboelectric charge of toners (H.-T. Macholdt, A. Sieber, Dyes & Pigments 9 (1988), 119–127). Because of the different triboelectric effects of colorants and the resulting effect, sometimes very pronounced, on toner chargeability, it is not possible simply to add the colorants to a toner base formulation made available at the start. On the contrary, it may be necessary to make available for each colorant an individual formulation to which the nature and amount of the required charge control agent are tailored specifically. This procedure is, accordingly, laborious and, in the case of color toners for the three-color process, represents a further difficulty in addition to those already described above.

Another important practical requirement is that the colorants should have high thermal stability and good dispersibility. Typical temperatures at which colorants are incorporated into the toner resins, when using kneading equipment or extruders, are between 100° C. and 200° C. Correspondingly, thermal stability at 200° C., and better still at 250° C., is a great advantage. It is also important for the thermal stability to be assured over a relatively long period (about 30 minutes) and in a variety of binder systems. Typical toner binders are addition polymerization resins, polyaddition resins and polycondensation resins, such as styrene, styrene-acrylate, styrene-butadiene, acrylate, polyester, phenolic-epoxy resins, polysulfones and polyurethanes, individually or in combination, which may also contain further components such as charge control agents, waxes or flow assistants, or may have these components added subsequently.

Yellow pigments for electrophotographic toners and developers are in use in numerous forms. In general, azo-based pigments are preferred, above all because of their color, their color strength and their dispersion properties. Yellow azo pigments which are typically employed are C.I. Pigment Yellow 12, C.I. Pigment Yellow 13, C.I. Pigment Yellow 17, C.I. Pigment Yellow 174 and C.I. Pigment Yellow 176.

Disadvantages of these pigments are the fact that some of them lack thermal stability (especially the diarylide pigments), and, on ecological grounds, that organically bonded chlorine or heavy metals are present in the molecule.

One of the few azo pigments which meets the ecological requirements as well is C.I. Pigment Yellow 180. Commercially available Pigment Yellow 180, however, even in its most transparent form has the disadvantage of a level of transparency which is inadequate for use in full-color toners, rendering its use in this sector impossible from the outset. Furthermore, this pigment has a triboelectric effect which influences toner chargeability toward negative polarity.

The transparency is of central importance, since in full-color copying or printing the colors yellow, cyan and magenta are copied or printed on top of one another, the sequence of colors depending on the apparatus. If, then, an overlying color is not sufficiently transparent, the color below it is unable to show through to an adequate extent and the color reproduction is distorted. When copying or printing onto overhead sheets, the transparency is even more important, since a lack of transparency even in only one color makes the entire projected image appear gray.

Fundamentally there is a need for pigments having a minimal inherent triboelectric effect, since these pigments can then be employed without problems for both positively and negatively chargeable toners.

The object of the present invention was to provide a transparent yellow pigment of good color strength which possesses a less negative inherent triboelectric effect and which, furthermore, satisfies the abovementioned requirements from the ecological standpoint.

This object has surprisingly been achieved by the azo pigment detailed below, a characteristic of which is its particularly large surface area. The present invention provides an azo pigment of the formula (1)

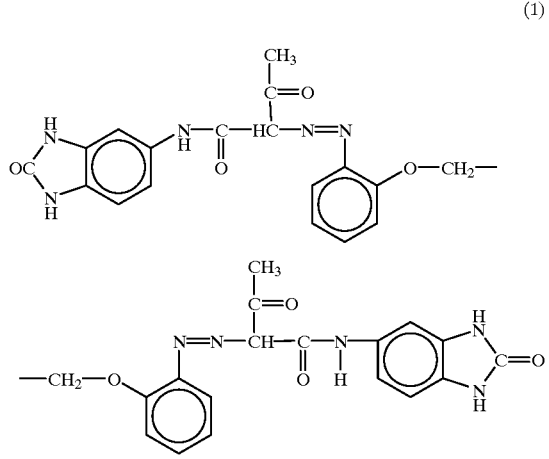

(1)

which has a specific surface area of the pigment powder of more than 45 m$^2$/g, preferably more than 55 m$^2$/g and, in particular, more than 60 m$^2$/g.

The surface area from 62 to 78 m$^2$/g as described in these examples. The surface area can be greater than 78 m$^2$/g such as at least 80 m$^2$/g up to about 150 m$^2$/g. The surface area of about 86 m$^2$/g also produces good results.

The pigment of the formula (1) is already known per se (U.S. Pat. No. 4,870,164 and 4,935,502) and is marketed under the name ®Novoperm-Gelb P-HG. This known pigment, however, even in its hitherto most transparent form possesses a specific surface area of not more than 44 m$^2$/g, in conjunction with an average particle size d$_{50}$ of at least 140 nm. A pigment of the formula (1) having a specific surface area of more than 45 m$^2$/g in conjunction with an average particle size d$_{50}$ of 120 nm or less has not hitherto been described.

Apart from an improved, larger specific surface area and, in conjunction therewith, an improved, smaller average particle size, the pigment of the invention also has a different particle morphology. Whereas the most transparent form known to date possesses rodlike particles, the pigment of the invention crystallizes in a cuboid form. This can also be illustrated by the length/width ratio of the pigment particles. The particles of the pigment known to date have a length/width ratio of more than 2:1, while the pigment of the invention has a length/width ratio of less than 1.6:1.

The process for the preparation of an azo pigment of the formula (1) having the features mentioned comprises carrying out the synthesis at unusually low temperatures and by rapid addition of the diazo component to form the initially charged coupling component—pouring in within a few seconds is even possible—in the presence or absence of an ionic or nonionic surfactant. This process deviates substantially from the prevailing teaching, according to which azo pigments are prepared with low concentration gradients, i.e. slow addition of the diazo component to the initially charged coupling component, in the coupling suspension. By overcoming this prejudice it is possible to synthesize the pigment in a previously unknown, extremely finely divided but highly aggregated and agglomerated form (prepigment) which is free from unwanted decomposition products. The tendency to aggregation, which is undesirable per se, can be eliminated by aftertreatment with an organic solvent. In the course of such a treatment, the crystal defects are eliminated and the specific surface energy is lowered. This procedure features a sharp increase in the BET surface area of the pigment by a factor of from 10 to 100 during the aftertreatment.

The present invention also provides a process for the preparation of an azo pigment of the formula (1) having the particular features mentioned by azo coupling of 1,2-bis(2-aminophenoxy)ethane bisdiazonium salt (diazo component) with 5-acetoacetylaminobenzimidazol-2-one (coupling component), which comprises carrying out the azo coupling at a temperature of between 5 and 35° C., preferably between 10 and 30° C., and by adding the diazo component to the initially charged coupling component over the course of not more than 30 minutes, preferably not more than 15 minutes, with or without the addition prior to, during or after the azo coupling of an ionic or nonionic surfactant, and then subjecting the agglomerated prepigment which has been formed to a solvent finish—organic or aqueous organic media are particularly preferred.

Surfactants which have proven particularly suitable in the context of the present invention are nonionic alkoxylates of alcohols, fatty alcohols, phenols, alkylphenols, naphthols, alkylnaphthols and fatty amines with ethylene oxide and/or propylene oxide, and block polymers of ethylene oxide and propylene oxide; also suitable are compounds containing a poly(ethyleneoxy) chain or a poly(ethyleneoxy)-poly(methylethyleneoxy) chain which are attached via an oxygen or nitrogen atom to radicals of the following type: primary or secondary alkyl radicals of 6 to 26 carbon atoms, especially alkyl radicals of 10 to 18 carbon atoms in chain length, specifically the nonyl, decyl, undecyl, dodecyl, tridecyl, tetradecyl, pentadecyl, hexadecyl, heptadecyl, octadecyl, 2-butyloctyl, 2-phenyloctyl, 2-hexyldecyl, 2-heptylundecyl, 2-octyldodecyl, 2-nonyltridecyl, 2-decyltetradecyl, 10-undecenyl, oleyl, 9-octadecenyl, linoleyl or linolenyl radical; cycloaliphatic radicals of 6 to 30 carbon atoms; aromatic radicals, such as the phenyl or alkylphenyl radical, each of which is unsubstituted or substituted with up to three primary or secondary alkyl radicals, preferably the hexylphenyl, heptylphenyl, octylphenyl, nonylphenyl, undecylphenyl, dodecylphenyl, isononylphenyl, tributylphenyl or dinonylphenyl radical, it being possible for the phenyl radical to be substituted with further aromatic radicals, such as the benzyl-p-phenylphenyl radical; naphthyl or alkylnaphthyl radicals, preferably the α-naphthyl or β-naphthyl radical or the alkyl-β-naphthyl radical having 1 to 3 unbranched or branched alkyl groups, for example methyl, butyl, octyl, nonyl, decyl, dodecyl or tetradecyl; unsubstituted or alkyl-substituted heterocyclic radicals or alkyl radicals substituted with heterocyclic radicals, such as, for example, the 2-[2-(8-heptadecen-1-yl)-4,5-dihydro-1-imidazolyl]ethyl radical.

It is also possible to employ mixtures of the abovementioned compounds, especially mixtures as are obtained in the alkoxylation—using ethylene oxide and/or propylene oxide—of synthetic fatty alcohols from the oxo synthesis or of fatty alcohols obtained from natural raw materials (after fat cleavage and reduction). Natural raw materials which may be mentioned include coconut oil, palm kernel oil, cottonseed oil, sunflower oil, soybean oil, linseed oil, rapeseed oil, tallow and fish oil. Also suitable are appropriate fatty amine alkoxylates derived from these natural raw materials, especially coconut fatty amine, tallow amine, oleylamine or dialkyl-fatty amine oxides, such as dimethylcocoalkylamine oxide. Other substances worthy of mention are alkoxylated, relatively high molecular weight surface-active auxiliaries (surfactants) as are described, for example, in the following documents: DE-A1-27 30 223, DE-B2-21 56 603, DE-A1-30 26 127, DE-B2-24 21 606 and EP-A1-0 017 189.

Yet another possibility is the use of modern nonionic surfactants based on renewable raw materials, such as, for example, sugar alkylates, and it is also possible for all of the nonionic surfactants mentioned to be employed as a mixture with anionic or cationic surfactants. Among anionic surfactants, particular interest attaches to those which comprise, as polar hydrophilic group, sulfonic acid, sulfuric acid monoester, phosphoric acid partial ester or carboxylate functions. The cationic surfactants generally comprise a quaternary amine function and appropriate counterions such as halide or anions which derive from oxo acids of the main group elements.

The solvent finish is carried out under conventional conditions as described, for example, in U.S. Pat. No. 4,870,164 and 4,935,502. The most expedient procedure is to use isobutanol or an isobutanol/water mixture as the organic medium and to carry out heating at from 50 to 150° C., preferably from 90 to 110° C., for from 0.1 to 10 hours, preferably from 0.5 to 2 hours and, with particular preference, from 60 to 70 minutes.

By means of the preparation process of the invention, said azo pigment is obtained in a form which enables its use as colorant in electrophotographic toners and developers, i.e. it possesses a markedly improved transparency in comparison with previously known C.I. Pigment Yellow 180, and a less negative inherent triboelectric effect.

Apart from its use in electrophotographic toners and developers, a triboelectrically modified inherent effect of a pigment can also improve the electrostatic charge of powders and coatings, especially in triboelectrically or electrokinetically sprayed powder coatings as are used to coat surfaces of articles made from, for example, metal, wood, plastic, glass, ceramic, concrete, textile material, paper or rubber. Powder coating technology is used, for example, when coating small articles, such as garden furniture, camping equipment, domestic appliances, vehicle components, refrigerators and shelving, and for coating workpieces of complex shape. The powder coating or the powder receives its electrostatic charge, in general, by one of the following two processes:

a) in the corona process, the powder coating or the powder, under guidance, passes a charged corona and in so doing is charged;

b) in the triboelectric or electrokinetic process, the principle of frictional electricity is utilized.

In the spray apparatus, the powder coating or the powder receives an electrostatic charge which is opposite to the charge of its friction partner, generally a hose or spray tube made, for example, of polytetrafluoroethylene. It is also possible to combine the two processes.

Typical powder coating resins employed are epoxy resins, polyester resins containing carboxyl and hydroxyl groups, polyurethane resins and acrylic resins, together with the conventional curing agents. Combinations of resins are also used. For example, epoxy resins are often employed in combination with polyester resins contains carboxyl and hydroxyl groups. Examples of typical curing components for epoxy resins are acid anhydrides, imidazoles and dicyandiamide, and derivatives thereof. Examples of typical curing components for polyester resins containing hydroxyl groups are acid anhydrides, blocked isocyanates, bisacylurethanes, phenolic resins and melamine resins. Examples of typical curing components for polyester resins containing carboxyl groups are triglycidyl isocyanurates or epoxy resins. Typical curing components used in acrylic resins are, for example, oxazolines, isocyanates, triglycidyl isocyanurates or dicarboxylic acids.

The disadvantage of inadequate charging can be seen above all in triboelectrically or electrokinetically sprayed powders and powder coatings which have been prepared using polyester resins, in particular polyesters containing carboxyl groups, or using so-called mixed powders, also referred to as hybrid powders. Mixed powders are powder coatings whose resin base comprises a combinations of epoxy resin and polyester resin containing carboxyl groups. Mixed powders form the basis of the powder coatings used most commonly in practice. Inadequate charging of the abovementioned powders and powder coatings results in inadequate deposition rate and throwing power on the workpiece to be coated, in which context it is known that, under certain circumstances, the inherent triboelectric effect of a pigment may also be responsible for the loss of chargeability of a resin system which is suitable per se (H.-T. Macholdt, "Ladungssteuermittel also Knozept für die triboelektrische Aufladung" [Charge control agents as a concept in triboelectric charging]; EPS series "Praxis Forum, Fachbroschüre Oberflächentechnik 27/91" page 102–111; Technik+ Kommunikations Verlags GmbH, Berlin (1991)). The term "throwing power" is a measure of the extent to which a powder or powder coating is deposited on the workpiece to be coated, including its rear faces, cavities, fissures and, in particular, its inner edges and angles.

Furthermore, a modified inherent triboelectric effect of a pigment may lead to an improvement in the electret properties in colored (pigmented) electret materials, typical electret materials being based on polyolefins, halogenated polyolefins, polyacrylates, polyacrylonitriles, polystyrenes or fluorinated polymers, for examples polyethylene, polypropylene, polytetraluoroethylene and perfluorinated ethylene and propylene, or on polyesters, polycarbonates, polyamides, polyimides, polyether ketones, polyarylene sulfides, especially polyphenylene sulfides, polyacetals, cellulose esters, polyalkylene terephthalates and mixtures thereof. Electret materials have a multitude of applications and may receive their charge by corona charging or triboelectric charging (cf. G. M. Sessler, "Electrets", Topics in Applied Physics, Vol. 33, Springer Verlag, New York, Heidelberg, 2nd ed., 1987).

Furthermore, a modified inherent triboelectric effect of a pigment may lead to enhanced separation characteristics of colored (pigmented) polymers which are separated by electrostatic methods (see Y. Higashiyau, J. of Electrostatics, 30, 1993, 203–212, and the literature cited therein, and J. A. Cross "Electrostatics—Principles, Problems and Applications", Adam Hilger, Bristol, 1987, especially chapter 5.3 "Electrostatic Separation" and the literature cited therein). Accordingly, the inherent triboelectric effect of pigments is also of importance for the mass coloring of plastics. This inherent triboelectric effect is also of importance in process or processing steps in which there is intense frictional contact, examples being spinning processes, filmdrawing processes or other shaping processes.

In addition, the azo pigments of the invention are also suitable as colorants in printing inks, coating materials, paints, plastics, rubber materials, office requisites, wood paints, cleaning and scouring compositions, artists' colors and in inkjet inks—both aqueous and nonaqueous—and in those inks which operate by the hot-melt technique. Examples of typical printing inks are offset printing inks, halftone gravure printing inks and printing inks for aqueous and solvent-containing packaging printing and flexographic printing. Typical coating materials are automotive OEM finishes and refinishes, industrial finishes, and architectural coatings (e.g. polymer renders or emulsion paints). Typical examples of the coloration of polymers are that in rigid and flexible PVC (polyvinyl chloride), polyolefins or polystyrene.

The particular advantage of the azo pigment of the invention based on P.Y. 180, especially in toner binders, becomes evident in comparison with what up until now has been the standard of P.Y. 180 (Novoperm Gelb P-HG). For instance, in comparison with Novoperm Gelb P-HG, for example, the pigment synthesized in accordance with the invention (Example 1) has a transparency which is enhanced by a dL value of −1.98 (more transparent by 3 evaluation units), which represents a very considerable improvement for the purposes of practice. A point which should be emphasized in particular is that the pigments of the invention, in comparison with the home standard, not only have a smaller particle size but also have a particle morphology which is improved in that it shows a change from a pronounced acicular shape toward a cuboid shape. This improvement brings about much easier dispersibility and suspendability in polymeric materials and (organic) solvents.

The improvement in transparency which is obtained is of great advantage for practical purposes and is also immediately evident to the human eye. Moreover, it is surprising that, despite the great improvement in transparency owing to the very much greater specific surface area, the other advantageous color properties of the pigment, such as hue, thermal stability and light-fastness, are not lost. This can be seen, for example, in that in the X-ray diffraction diagram both the crystal modification and the position and width at half peak height values of the reflection bands remain unchanged.

Furthermore, the improvement in the inherent triboelectric effect of the pigment of the invention is clearly evident in relation to the prior art (Novoperm Gelb P-HG). Whereas Novoperm Gelb P-HG shows a pronounced negative triboelectric charge effect (Table 1, comparison), in the pigment of the invention this negative charge effect is sharply reduced (Tab. 1). For instance, a test toner containing 5% of the pigment of the invention (pigment 1.1) charges up to a peak value of only −8 μC/g, wherein a comparable test toner containing a prior art pigment (comparison example) charges up to a peak value of −20 μC/g.

TABLE 1

Comparison of the triboelectric behavior over time of various pigments (5% by weight) in toner binders (95% by weight)

| containing dispersed pigment [5% by weight] | | 10 min | 30 min | 120 min | 24 h |
|---|---|---|---|---|---|
| (A) Styrene-acrylate toner resin | | | | | |
| Comparison | μC/g | −17 | −23 | −24 | −24 |
| Pigment 2.1 | μC/g | −4 | −8 | −11 | −11 |
| (B) Polyester toner resin | | | | | |
| Comparison | μC/g | −10 | −12 | −20 | −19 |
| Pigment 3.1 | μC/g | +3 | +2 | −2 | −5 |
| Pigment 4.1 | μC/g | +1 | 0 | −4 | −6 |
| Pigment 1.1 | μC/g | 0 | 0 | −7 | −8 |

This reduced negative inherent triboelectric effect has the further advantageous consequence that the yellow pigments of the invention can be combined with numerous charge control agents, i.e. both those providing positive and those providing negative control, and exhibit good performance chargeabilities.

Charge control agents which are suitable for use in combination with the yellow pigment according to the invention are:
triphenylmethanes; ammonium and iminium compounds; fluorinated ammonium and iminium compounds; biscationic acid amides; polymeric ammonium compounds; diallylammonium compounds; aryl sulfide derivatives; phenol derivatives; phosphonium compounds and fluorinated phosphonium compounds; calix[n]arenes; cyclically linked oligosaccharides (cyclodextrins); polyester salts; metal complex compounds; benzimidazolones; azines, thiazines or oxazines which are listed in the Color Index as pigments, solvent dyes, basic dyes or acid dyes.

Particular preference is given to the charge control agents cited below which are combined individually, or in combination with one another, with the yellow pigment according to the invention:

triarylmethane derivatives such as, for example:
Colour Index Pigment Blue 1, 1:2, 2, 3, 8, 9, 9:1, 10, 10:1, 11, 12, 14, 18, 19, 24, 53, 56, 57, 58, 59, 61, 62, 67 or, for example, Colour Index Solvent Blue 2, 3, 4, 5, 6, 23, 43, 54, 66, 71, 72, 81, 124, 125, and the triarylmethane compounds listed in the Colour Index under acid blue and basic dye, provided their temperature stability and processability make them suitable, such as, for example, Colour Index Basic Blue 1, 2, 5, 7, 8, 11, 15, 18, 20, 23, 26, 36, 55, 56, 77, 81, 83, 88, 89, Colour Index Basic Green 1, 3, 4, 9, 10, with very particular suitability being possessed in turn by Colour Index Solvent Blue 125, 66 and 124. A particularly suitable substance is Colour Index Solvent Blue 124 in the form of its highly crystalline sulfate or the trichlorotriphenylmethyltetrachloroaluminate.

Examples of the charge control agents of the triphenylmethane series which are particularly suitable for the preparation of electret fibers are the compounds described in DE-A-19 19 724 and DE-A-16 44 619.

Other suitable triphenylmethanes are those described in U.S. Pat. No. 5,061,585, especially those of the formula (2)

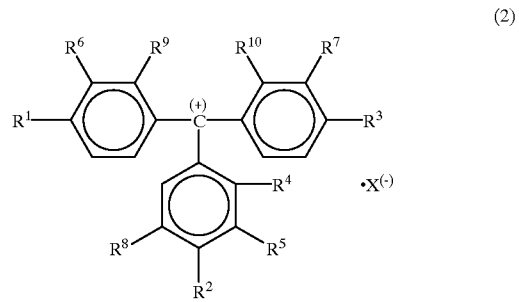

(2)

in which
$R^1$ and $R^3$ are identical or different and are —$NH_2$, a mono- or dialkylamino group whose alkyl groups have 1 to 4, preferably 1 or 2, carbon atoms, a mono- or di-omega-hydroxyalkylamino group whose alkyl groups have 2 to 4, preferably 2, carbon atoms, an unsubstituted or N-alkyl-substituted phenylamino or phenalkylamino group whose alkyl has 1 to 4, preferably 1 or 2, carbon atoms, whose phenalkyl group has 1 to 4, preferably 1 or 2, carbon atoms in the aliphatic bridge and whose phenyl ring may carry one or two of the following substituents: alkyl having 1 or 2 carbon atoms, alkoxy having 1 or 2 carbon atoms and the sulfo group, $R^2$ is hydrogen or is as defined for $R^1$ and $R^3$, $R^4$ and $R^5$ are hydrogen, halogen, preferably chlorine, or a sulfo group, or $R^4$ with $R^5$ together form a fused-on phenyl ring, $R^6$, $R^7$, $R^9$ and $R^{10}$ are each hydrogen or an alkyl radical having 1 or 2 carbon atoms, preferably methyl, and $R^8$ is hydrogen or halogen, preferably chlorine, and $X^-$ is a stoichiometric equivalent of an anion, especially a chloride, sulfate, molybdate, phosphoromolybdate or borate anion.

Particular preference is given to a charge control agent of the formula (2) in which $R^1$ and $R^3$ are phenylamino groups, $R^2$ is an m-methylphenylamino group and the radicals $R^4$ to $R^{10}$ are all hydrogen.

Also suitable are ammonium and iminium compounds as described in U.S. Pat. No. 5,015,676.

Further suitable compounds are fluorinated ammonium and iminium compounds as described in U.S. Pat. No. 5,069,994, especially those of the formula (3)

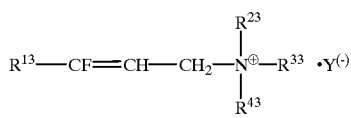

(3)

in which $R^{13}$ is perfluorinated alkyl having 5 to 11 carbon atoms, $R^{23}$, $R^{33}$ and $R^{43}$ are identical or different and are alkyl having 1 to 5, preferably 1 or 2, carbon atom, and $Y^-$ is a stoichiometric equivalent of an anion, preferably a tetrafluoroborate or tetraphenylborate anion.

Preferably $R^{13}$ is perfluorinated alkyl having 5 to 11 carbon atoms, $R^{23}$ and $R^{33}$ are ethyl and $R^{43}$ is methyl.

Suitability also extends to biscationic acid amides as described in U.S. Pat. No. 5,342,723, especially those of the formula (4)

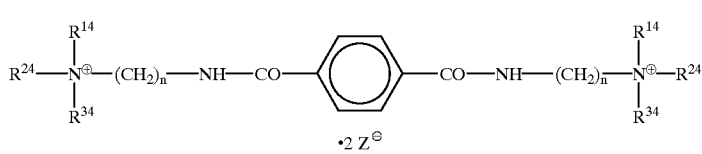

(4)

in which $R^{14}$, $R^{24}$ and $R^{34}$ are identical or different alkyl radicals having 1 to 5 carbon atoms, preferably methyl, n is an integer from 2 to 5, and $Z^-$ is a stoichiometric equivalent of an anion, preferably a tetraphenylborate anion.

Also suitable are diallylammonium compounds as described in CA-A-2,085,809, especially those of the formula (5)

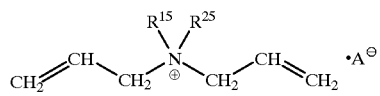

(5)

in which $R^{15}$ and $R^{25}$ are identical or different alkyl groups having 1 to 5, preferably 1 or 2, carbon atoms, but especially methyl groups, and $A^-$ is a stoichiometric equivalent of an anion, preferably a tetraphenylborate anion, and the polymeric ammonium compounds of the formula (6) which are obtainable from these, as described in U.S. Pat. Nos. 5,401,809 or 5,187,038,

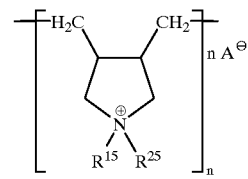

(6)

in which n has a value which corresponds to molecular weights of from 5000 to 500,000. Particular preference, however, is given to compounds of the formula (6) having molecular weights of from 40,000 to 400,000.

Further suitable compounds are aryl sulfide derivatives as described in U.S. Pat. No. 5,378,571, especially those of the formula (7)

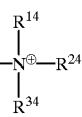

(7)

in which $R^{17}$, $R^{27}$, $R^{37}$ and $R^{47}$ are identical or different alkyl groups having 1 to 5, preferably 2 or 3, carbon atoms, and $R^{57}$ is one of the divalent radicals —S—, —S—S—, —SO— or —SO$_2$—.

For example, $R^{17}$ to $R^{47}$ are propyl groups and $R^{57}$ is the group —S—S—.

Phenol derivatives as described in U.S. Pat. No. 4,795,690 are also suitable, especially those of the formula (8)

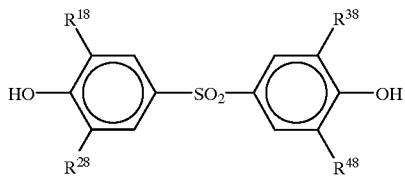
(8)

in which $R^{18}$ and $R^{38}$ are alkyl or alkenyl groups having 1 to 5, preferably 1 to 3, carbon atoms, and $R^{28}$ and $R^{48}$ are hydrogen or alkyl having 1 to 3 carbon atoms, preferably methyl.

Examples of such compounds are those in which $R^{18}$ to $R^{48}$ are methyl groups or in which $R^{28}$ and $R^{48}$ are hydrogen and $R^{18}$ and $R^{38}$ are the group —CH$_2$—CH=CH$_2$.

Suitability extends to phosphonium compounds and fluorinated phosphonium compounds as described in U.S. Pat. No. 5,021,473 and U.S. Pat. No. 5,147,748, especially those of the formula (9)

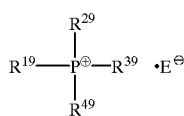
(9)

in which $R^{19}$, $R^{29}$, $R^{39}$ and $R^{49}$ are identical or different alkyl groups having 1 to 8, preferably 3 to 6, carbon atoms and $E^\ominus$ is a stoichiometric equivalent of an anion, preferably a halide anion;

and (10)

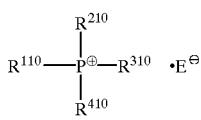
(10)

in which $R^{110}$ is a highly fluorinated alkyl radical having 5 to 15, preferably 6 to 10, carbon atoms, $R^{210}$, $R^{310}$ and $R^{410}$ are alkyl having 3 to 10 carbon atoms or phenyl.

An example of a compound of the formula (9) is tetrabutylphosphonium bromide, or examples of compounds of the formula (10) are the compounds where $R^{110}$=C$_8$F$_{17}$—CH$_2$—Ch$_2$—, $R^{210}$=$R^{310}$=$R^{410}$=phenyl and $E^\ominus$=PF$_6^\ominus$ or the tetraphenylborate anion.

Also possessing suitability are calix[n]arenes as described in U.S. Pat. No. 5,049,467 and as described in U.S. Pat. No. 5,275,905, especially those of the formula (11)

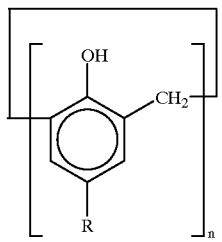
(11)

in which

R is hydrogen, halogen, preferably chlorine, straight-chain or branched alkyl having 1 to 12 carbon atoms, aralkyl, e.g. benzyl or phenethyl, —NO$_2$, —NH$_2$ or NHR$^{111}$, where $R^{111}$ is alkyl having 1 to 8 carbon atoms, unsubstituted or C$_1$–C$_4$-alkyl-substituted phenyl or —Si(CH$_3$)$_3$.

Also suitable are metal complex compounds such as chromium, cobalt, iron, zinc or aluminum-azo complexes or chromium, cobalt, iron, zinc or aluminum-salicylic or boric acid complexes of the formulae (12), (13) and (14)

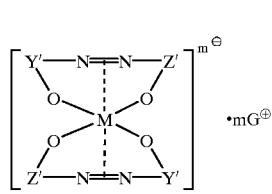
(12)

in which

M is a di- or trivalent metal atom, preferably chromium, cobalt, iron, zinc or aluminum, or a nonmetal such as boron or Si, Y' and Z' are divalent aromatic rings, preferably of the formulae

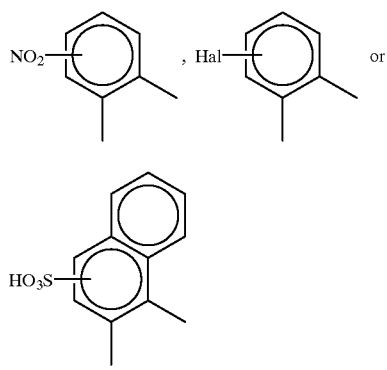

and m is 1 or 2;

(13)

[Chemical structure showing metal complex with substituents $R^{113}$, $R^{213}$, $R^{313}$ around a metal center M' with counterion ·G]

in which
  M' is a divalent or trivalent metal atom, preferably chromium, cobalt or iron,
  $R^{113}$ is hydrogen, halogen, preferably Cl, nitro or amidosulfonyl,
  $R^{213}$ is hydrogen or nitro,
  $R^{313}$ is hydrogen, sulfo, —CO—NH—$R^{413}$, wherein $R^{413}$ is phenyl or alkyl having 1 to 5 carbon atoms which is unsubstituted or substituted by a mono-, di- or trialkylamino group, and
  G in formulae (12) and (13) is in each case a counterion which provides for neutrality of the complex, preferably one or more protons, one or more alkali metal ions or ammonium ions;

(14)

[Chemical structure showing a metal complex with $R^{114}$ and $R^{214}$ substituents around a metal center M*]

in which
  M⁺ is a divalent central metal atom, preferably a zinc atom, and
  $R^{114}$ and $R^{214}$ are identical or different, straight-chain or branched alkyl groups having 1 to 8, preferably 3 to 6, carbon atoms, for example tert-butyl.

Compounds of this kind are described in EP-A-0 162 632, U.S. Pat. No. 4,908,225, EP-A-0 393 479, EP-A-0 360 617, EP-A-0 291 930, EP-A-0 280 272, EP-A-0 255 925, EP-A-0 251 326, EP-A-0 180 655, EP-A-0 141 377, U.S. Pat. Nos. 4,939,061, 4,623,606, 4,590,141 and/or are characterized by the CAS numbers 31714-55-3, 104815-18-1, 84179-68-8, 110941-75-8, 32517-36-5, 38833-00-00, 95 692-86-7, 85414-43-3, 136709-14-3, 135534-82-6, 135534-81-5, 127800-82-2, 114803-10-0, 114803-08-6.

Examples of particularly preferred metal complex compounds of the formula (13) are indicated in Table 2 below:

TABLE 2

| $R^{113}$ | $R^{213}$ | $R^{313}$ | $R^{413}$ | M' | G |
|---|---|---|---|---|---|
| Cl | H | H | — | Cr | H⁺ |
| NO₂ | NO₂ | —CONHR⁴¹³ | Phenyl | Cr | H⁺/Na⁺/NH₄⁺ |
| Cl | H | —CONHR⁴¹³ | Phenyl | Fe | H⁺/Na⁺/NH₄⁺ |
| Cl | H | —CONHR⁴¹³ | —(CH₂)₃—N⁺(CH₃)₃ | Cr | Cl |
| —SO₂NH₂ | H | H | — | Co | H⁺/Na⁺/NH₄⁺ |

Also suitable are benzimidazolones as described in EP-A-0 347 695, especially those of the formula (15)

(15)

[Chemical structure of benzimidazolone with $R^{115}$, $R^{215}$ substituents and L⁻ counterion]

in which
  $R^{115}$ is an alkyl having 1 to 5 carbon atoms and $R^{215}$ is an alkyl having 1 to 12 carbon atoms and L is a stoichiometric equivalent of an anoin, especially a chloride or tetrafluoroborate anion.

An example is the compound where $R^{115}$=CH₃ and $R^{215}$=$C_{11}H_{23}$.

Also of suitability are cyclically linked oligosaccharides as described in DE-A-44 18 842, especially those of the formula (16)

(16)

[Chemical structure of cyclic oligosaccharide unit with $X^{16}$, $R^{116}$, $R^{216}$ substituents and $n^{16}$ repeat]

in which
  $n^{16}$ is a number between 3 and 100, $R^{116}$ and $R^{216}$ are OH, OR³¹⁶, where $R^{316}$ is substituted or unsubstituted $C_1$–$C_{18}$-alkyl, $C_6$–$C_{12}$-aryl or tosyl, and $X^{16}$ is CH₂OH or CH₂COR³¹⁶. Examples are those where:
  $n^{16}$=6, $R^{116}$ and $R^{216}$=OH, $X^{16}$=Ch₂OH
  $n^{16}$=7, $R^{116}$ and $R^{216}$=OH, $X^{16}$=CH₂OH
  $n^{16}$=8, $R^{116}$ and $R^{216}$=OH, $X^{16}$=CH₂OH Other suitable compounds are polymer salts as described in CA-A-2,132,577, whose anionic component is a polyester comprising the reaction product of the individual components a), b) and c) and also, if desired, d) and e), where
  a) is a dicarboxylic acid or a reactive derivative of a dicarboxylic acid, which is free from sulfo groups,
  b) is a difunctional aromatic, aliphatic or cycloaliphatic sulfo compound whose functional groups are hydroxyl or carboxyl or hydroxyl and carboxyl,
  c) is an aliphatic, cycloaliphatic or aromatic diol, a polyether diol or a polycarbonate diol,
  d) is a polyfunctional compound (functionality<2) whose functional groups are hydroxyl or carboxyl or hydroxyl and carboxyl, and
  e) is a monocarboxylic acid, and whose cationic component comprises hydrogen atoms or metal cations.

Suitable in addition are azines of the following Colour Index Numbers: C.I. Solvent Black 5, 5:1, 5:2, 7, 31 and 50; C.I. Pigment Black 1, C.I. Basic Red 2 and C.I. Basic Black 1 and 2.

In principle, the pigment of the invention is particularly suitable in combination with positive and negative charge control agents (CCAs). As shown, for example, by Examples 4.4.2 to 4.4.5, even small quantities (e.g. 1%) of CCA are sufficient to establish the desired polarity. Particular advantages in this context are the rapidity with which the peak charging value is reached and its very good constancy. Since a prerequisite for good triboelectric (toner) charging is a high toner volume resistance (=low conductivity), the dielectric characteristics of the yellow pigment according to the invention contribute to the good triboelectric behavior (Ku/Liepins "Electrical Properties of Polymers" Hanser Publishers, Munich-Vienna-New York, 1987).

Pigment and charge control agent can be combined subsequently by physical mixing during pigment synthesis, during the finishing operation or by appropriate application to the pigment surface (pigment coating).

The invention also provides an electrophotographic toner or developer comprising a conventional toner binder, from 0.01 to 50% by weight, preferably from 0.5 to 20% by weight, of the azo pigment of the invention and from 0.01 to 20% by weight, preferably from 0.1 to 5% by weight, of a charge control agent from the class of the triphenylmethanes, ammonium and iminium compounds; fluorinated ammonium and iminium compounds; biscationic acid amides; polymeric ammonium compounds; diallylammonium compounds; aryl sulfide derivatives; phenol derivatives; phosphonium compounds and fluorinated phosphonium compounds; calix[n]arenes; cyclodextrins; polyester salts; metal complex compounds; benzimidazolones; azines, thiazines and oxazines.

Particular preference is given to electrophotographic toners or developers which comprise, as charge control agent, a compound of the formula (17)

or a compound of the abovementioned formula (3);
or a compound of the abovementioned formula (5) in which $R^{15}$ and $R^{25}$ are each methyl and $A^\ominus$ is a tetraphenylborate anion;
or a compound of the abovementioned formula (6) in which $R^{15}$ and $R^{25}$ are each methyl, $A^\ominus$ is a tetraphenylborate anion and n has a value which corresponds to molecular weights of from 5000 to 500,000;
or a compound of the abovementioned formula (7);
or a compound of the abovementioned formula (13), in which $R^{113}$ is chlorine, $R^{213}$ and $R^{313}$ are hydrogen, M' is chromium, cobalt or iron, and G is one or two protons;
or an abovementioned polymer salt whose anionic component is a polyester.

The ready suitability of the yellow pigment according to the invention for powder coating applications is evident from the charging current which even at a spray pressure of 3 bar is very high (1.7 µA in Example 4.4.5 or 1.5 µA in Example 3.4.5), in which context a charging current of 1 µA is typically regarded as the minimum requirement for adequate charging. The high charging current is paralleled by a good deposition rate of in each case distinctly more than 80%.

The invention additionally provides a powder or powder coating comprising an acrylic resin or polyester resin which contains epoxide, carboxyl or hydroxyl groups, or a combination of these resins, from 0.01 to 50% by weight, preferably from 0.1 to 5% by weight, of the azo pigment according to the invention and from 0.01 to 20% by weight, preferably from 1 to 5% by weight, of a charge control agent selected from the classes mentioned above for electrophotographic toners, and preferred compounds.

The pigment used in accordance with the invention is incorporated homogeneously—for example by extrusion or kneading—at a concentration of from 0.01 to 50% by weight, preferably from 0.5 to 20% by weight and particularly preferably from 0.1 to 5.0% by weight, based on the total mixture, into the binder of the respective toner, developer, coating material, powder coating, electret material or of the polymer to be electrostatically separated. In this context, the pigment employed in accordance with the invention can be added as dried and ground powder, dispersion or suspension in organic or inorganic solvents, filter cake, masterbatch, formulation, made-up paste, as a compound coated from aqueous or nonaqueous solution onto a suitable support, for example kieselguhr is siliceous earth, $TiO_2$, $Al_2O_3$, or in some other form. Similarly, it is in (17)

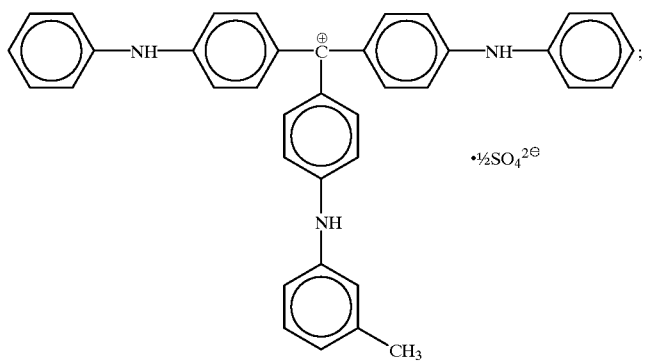

principle also possible to add the pigment used in accordance with the invention even during the preparation of the respective binders, i.e. in the course of their addition polymerization, polyaddition or polycondensation.

The level of electrostatic charging of the electrophotographic toners or of the powder coatings in which the pigment according to the invention is homogeneously incorporated cannot be predicted and is measured in standard test systems under identical conditions (identical dispersion times, identical particle size distribution, identical particle morphology) at about 20° C. and 50% relative atmospheric humidity. The toner is electrostatically charged by being brought together turbulently on a roller bench (150 revolutions per minute) with a carrier, i.e. a standardized frictional co-component (3 parts by weight of toner to 97 parts by weight of carrier). The electrostatic charge is then measured on a conventional q/m measurement setup (J. H. Dessauer, H. E. Clark, "Xerography and related Processes", Focal Press, N.Y., 1965, page 289; J. F. Hughes, "Electrostatic Powder Coating", Research Studies Press Ltd. Letchworth, Hertfordshire, England, 1984, Chapter 2). When determining the q/m value or the triboelectric charge of powder coatings, the particle size has a great influence, which is why strict attention is paid to a uniform particle size distribution when screen-classifying the samples of toner or powder coating obtained. For instance, a mean particle size of 10 $\mu$m is aimed at for toners, whereas for powder coatings a mean particle size of 50 $\mu$m is practicable.

The triboelectric spraying of the powders or powder coatings is carried out using a spray apparatus with a standard spray pipe and a star-shaped inner rod at maximum powder throughput with a spray pressure of 3 bar. For this purpose, the article to be sprayed is suspended in a spraybooth and sprayed from a distance of about 20 cm directly from the front, without any further movement of the spray apparatus. The charge of each sprayed powder is then measured using a "device for measuring the triboelectric charge of powders" from Intec (Dortmund). To carry out the measurements the antenna of the measuring device is held directly in the cloud of powder emerging from the spray apparatus. The current strength resulting from the electrostatic charge of powder coating or powder is indicated in $\mu$A. The deposition rate is then determined in % by differential weighing of the sprayed and of the deposited powder coating.

The transparency of the yellow pigment according to the invention in toner binder systems is investigated as follows: 30 parts by weight of the pigmented test toner (for preparation see use Example 1) is incorporated by stirring with a dissolver (5 min at 5000 rpm) into 70 parts by weight of a crude varnish (consisting of 15 parts by weight of the respective toner resin and 85 parts by weight of ethyl acetate).

The test toner varnish produced in this way is knife-coated onto suitable paper (e.g. letterpress paper) against a standard pigmented varnish produced in the same way, using a Handcoater (from RK Chemical Co. Ltd., England). A suitable size for the doctor knife is e.g. K bar N 3 (=24 $\mu$m layer thickness). In order for the transparency to be determined with greater ease, the paper has printed on it a black bar, and the transparency differences in terms of dL values are determined in accordance with DIN 55 988 or in accordance with the test procedure from Pigments Marketing, Hoechst AG "Visuelle und Farbmetrische Bewertung" [Visual and colorimetric evaluation] of Sep. 13, 1990 (No. 1/1).

The residual salt content which is indicated when characterizing the pigment describes the specific conductivity of the extract of an aqueous pigment suspension (in accordance with the test procedure from Pigments Marketing, Hoechst AG No. 1/10 (2/91) "Bestimmung der spezifischen Leitfähigkeit am Extrakt einer wäBrigen Pigmentsuspension" [Determination of the specific conductivity of an extract of an aqueous pigment suspension]), while the corresponding pH is determined in accordance with the test procedure from Pigments Marketing, Hoechst AG No. 1/9 (2/91) "Bestimmung des pH-Wertes am Extrakt einer wäBrigen Pigmentsuspension" [Determination of the pH of an extract of an aqueous pigment suspension], double-distilled water instead of the deionized water specified in the test procedure being used for both determination methods.

EXAMPLE 1

1.1 Pigment Synthesis a) 73.2 g (0.3 mol) of 1,2-bis(2-aminophenoxy)ethane in 300 ml of water are converted into the hydrochloride using 150 ml of hydrochloric acid (31% HCl) and the temperature is adjusted to 0 to 5° C. using ice. 41.8 g of sodium nitrite in the form of an aqueous solution containing 40% by weight $NaNO_2$ are then added in order to bring about diazotization. The excess nitrite is destroyed after 15 min using amidosulfonic acid.

b) 150.8 g (0.68 mol) of 5-acetoacetylaminobenzimidazole-2-one are dissolved in 900 ml of water with 150 ml of sodium hydroxide solution (33% by weight NaOH), the temperature is adjusted to 5° C. using ice, and precipitation is induced in the presence of 12 g of dimethylcocoalkylamine oxide using acetic acid to pH 5.3.

c) Subsequent coupling is carried out over the course of 10 min at 25° C. 40 g of powdered chalk are added, and after 10 min the pH is adjusted to 5. The pigment is filtered and washed free of salt. Yield: virtually quantitative. The specific surface are in accordance with BET of a dried sample of the filter cake is determined; 1 $m^2/g$ ("prepigment")

d) 110 g of pigment are heated with 1400 g of water and 910 g of isobutanol for 2 hours at 110° C. in an autoclave under the autogenous pressure. The pigment is isolated in the conventional manner. A dried sample has a specific surface area of 78 $m^2/g$.

1.2 Pigment Characteristics

BET surface area: 78 $m^2/g$

Residual moisture content: 0.7% (Karl-Fischer)

Residual salt content: 0.1 mS/cm pH: 7

Thermal stability: commencement of decomposition about 350° C., maximum decomposition about 365° C., DTA, 3° C./min heating rate; closed glass ampule);

Particle size and morphology (mass distribution counted using electron microscopy):

Particle size and particle morphology are determined by taking an electromicrograph of the pigment powder. For this purpose, the pigment is dispersed in water for 15 min and then applied by spraying. The micrographs are taken at 3700 and 34,000 magnification.

Particle size:

$d_{50}$=61 nm; $d_{10}$=44 nm; $d_{95}$=118 nm.

Particle morphology:

The length/width ratio was determined as 1.53:1. The micrographs show approximately cuboid particles (no pronounced acicular shape as with the comparison).

X-ray diffraction diagram

| 2 theta | Relative intensity % | Width at half peak height |
|---|---|---|
| 25.5 | 100 | 0.71 |
| 13.3 | 90 | 0.83 |
| 6.6 | 59 | 0.68 |
| 9.5 | 51 | 0.54 |
| 19.3 | 45 | 0.93 |
| 17.4 | 22 | 0.81 |
| 28.3 | 21 | 0.70 | and a few other relatively small bands and shoulders.

1.3 Transparency

In a toner resin (polyester based on bisphenol A), an improved transparency was measured (24 $\mu$m layer thickness), the pigmented test toner having been prepared as in Example 1.4.1.

In relation to the standard indicated in the comparison example, a dL value of −1.98 is measured by way of the black bar (i.e. the black bar appears darker), i.e. the pigment is about 3 more transparent than the comparison.

Assessment of the transparency differences in accordance with test procedure 1/1: 1 =trace, 2=slightly; 3=noticeably; 4=distinctly; 5=substantially; 6=significantly more transparent.

1.4 Electrostatic Properties 5 parts of the pigment from Example 1.1 are incorporated homogeneously using a kneading apparatus into 95 parts of a toner binder (polyester based on bisphenol A) in the course of 45 min. The composition is then milled on a laboratory universal mill and subsequently classified on a centrifugal screen-classifier. The desired particle fraction (4 to 25 $\mu$m) is activated using a carrier which consists of silicone-coated magnetite particles with a size of 50 to 200 $\mu$m (bulk density 2.75 g/cm$^3$); (FBM 96–100; from Powder Techn.).

Measurement is carried out using a conventional q/m measurement setup. A screen with a mesh size of 25 $\mu$m is used to make sure that, when the toner is blown out, no carrier is ejected with it. Measurements are carried out at 40 to 60% relative atmospheric humidity. As a function of the activation period, the following q/m values [$\mu$C/g] are measured:

| Activation period | Charge q/m [$\mu$C/g] |
|---|---|
| 10 min | 0 |
| 30 min | 0 |
| 2 h | −7 |
| 24 h | −8 |

EXAMPLE 2

2.1 Pigment Synthesis

The procedure of Example 1 is followed but the following changes are made:
a) Instead of 12 g of dimethylcocoalkylamine oxide, 6 g each of an alkyl ethylene oxide polyglycol phosphate, e.g. ®Hostaphat L, and of a fatty alcohol propylglycol ether based on isotridecyl alcohol, e.g. ®Genapol X 060 (Hoechst AG), are added, and b) the subsequent coupling is carried out in 30 minutes at 25° C.

Specific BET surface area without solvent treatment (dried filter cake): 9.6 m$^2$/g. Finished pigment after solvent treatment: 62 m$^2$/g.

2.2 Pigment Characteristics

BET surface area: 62 m$^2$/g
Residual moisture content: 0.5% (Karl-Fischer)
Residual salt content: 0.1 mS/cm
pH: 7.1
X-ray diffraction diagram:

| 2 theta | Relative intensity % | Width at half peak height |
|---|---|---|
| 25.5 | 100 | 0.68 |
| 13.3 | 80 | 0.58 |
| 6.6 | 57 | 0.66 |
| 9.5 | 46 | 0.5 |
| 19.4 | 41 | 1.3 |
| 29.4 | 21 | 0.6 |
| 12.6 | 19 | 0.54 | and a few other relatively small bands and shoulders.

2.3 Transparency

The transparency is measured as described in Example 1.3. In relation to the comparison, a dL of −1.28 (i.e. just under 3 more transparent) is found.

2.4 Electrostatic Properties 5 parts of the pigment are incorporated as described in Example 1.4 into a toner binder which constitutes, instead of the polyester, a 60:40 styrene-acrylate copolymer, e.g. ®Dialec S 309, and measurement is carried out:

| Activation period | Charge q/m [$\mu$C/g] |
|---|---|
| 10 min | −4 |
| 30 min | −8 |
| 2 h | −11 |
| 24 h | −11 |

EXAMPLE 3

3.1 Pigment Synthesis

The procedure of Example 2 is followed but with the modification that coupling is carried out in 10 minutes at 25° C.

3.2 Pigment Characterization

BET surface area: 70 m$^2$/g
Residual moisture content: 0.2% H$_2$O (Karl-Fischer)
Residual salt content: 0.1 mS/cm
pH: 7.1
Thermal stability: beginning of decomposition about 350° C., maximum decomposition about 360° C. (DTA, 3° C./min heating rate; closed glass ampule)

Particle size and morphology (mass distribution counted using electron microscopy):

particle size:

$d_{50} = 104$ nm; $d_{10} = 70$ nm; $d_{95} = 170$ nm.

Particle morphology:

The length/width ratio was determined at 1.45:1. The micrographs show approximately cuboid particles (no pronounced acicular form as in the comparison).

X-ray diffraction diagram:

| 2 theta | Relative intensity % | Width at half peak height |
|---|---|---|
| 25.5 | 100 | 0.73 |
| 13.3 | 91 | 0.87 |
| 6.6 | 60 | 0.69 |
| 9.5 | 49 | 0.57 |
| 19.4 | 42 | 1.2 |
| 17.4 | 21 | 0.89 |
| 28.3 | 16 | 0.67 | and a few other relatively small bands and shoulders.

Dielectric characteristics:

$\Omega \cdot cm$: $10^{12}$ $\epsilon$: 4.4 (1 kHz)

$\tan \delta$ $5 \times 10^{-2}$ (1 kHz)

3.3 Transparency

The transparency is measured as described in Example 1.3. In relation to the comparison, a dL of −1.91 (i.e. about 3 more transparent) is found.

3.4 Electrostatic Properties 3.4.1. 5 parts of the pigment from Example 3.1 are incorporated homogeneously using a kneading apparatus into 95 parts of a toner binder (polyester based on bisphenol A) in the course of 45 min. The composition is then milled on a laboratory universal mill and subsequently classified on a centrifugal screen-classifier. The desired particle fraction (4 to 25 $\mu$m) is activated using a carrier which consists of silicone-coated magnetite particles with a size of 50 to 200 $\mu$m (bulk density 2.75 g/cm$^3$); (FBM 96–100; from Powder Techn.).

Measurement is carried out using a conventional q/m measurement setup. A screen with a mesh size of 25 $\mu$m is used to make sure that, when the toner is blown out, no carrier is ejected with it. Measurements are carried out at 40 to 60% relative atmospheric humidity. As a function of the activation period, the following q/m values [$\mu$C/g] are measured:

| Activation period | Charge q/m [$\mu$C/g] |
|---|---|
| 10 min | +3 |
| 30 min | +2 |
| 2 h | −2 |
| 24 h | −5 |

3.4.2 5 parts of the pigment and 1 part of the charge control agent described in DE-A-39 01 153, Preparation Example 1 (highly fluorinated ammonium salt) of the formula

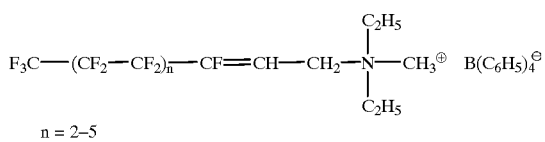

$n = 2–5$ are incorporated as described in Example 1.4 into a toner binder, and measurements are carried out. As a function of the activation period, the following q/m values [$\mu$C/g] are measured.

| Activation period | Charge q/m [$\mu$C/g] |
|---|---|
| 10 min | −17 |
| 30 min | −17 |
| 2 h | −19 |
| 24 h | −16 |

3.4.3 5 parts of the pigment and 1 part of the charge control agent described in U.S. Pat. No. 5,187,038, Preparation Example 2 (cationic polymer) of the formula

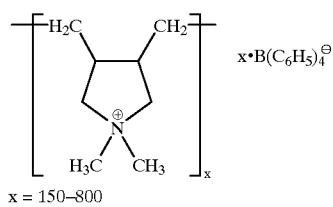

$x = 150–800$ are incorporated as described in Example 1.4 into a toner binder, and measurements are carried out. As a function of the activation period, the following q/m values [$\mu$C/g] are measured.

| Activation period | Charge q/m [$\mu$C/g] |
|---|---|
| 10 min | −10 |
| 30 min | −10 |
| 2 h | −11 |
| 24 h | −12 |

3.4.4 5 parts of the pigment and 1 part of the charge control agent described in European Patent Application EP-A2-0 664 463, Preparation Example 1.2.4 (polyester salt) are incorporated as described in Example 1.4 into a toner binder, and measurements are carried out. As a function of the activation period, the following q/m values [$\mu$C/g] are measured.

| Activation period | Charge q/m [$\mu$C/g] |
|---|---|
| 10 min | −2 |
| 30 min | −6 |
| 2 h | −12 |
| 24 h | −11 |

3.4.5 5 parts of the pigment from Preparation Example 3.1 are incorporated homogeneously as described in Use Example 1.4 into 95 parts of a powder coating binder based on a triglycidyl isocyanurate (TGIC) polyester. In order to determine the deposition rate, 30 g of the test powder coating are sprayed with a defined pressure through a triboelectric gun. By differential weighing, the quantity of powder coating deposited can be determined, and a deposition rate in % can be defined, and a current flux ($\mu$A) can be derived from the charge transfer.

| Pressure [bar] | Current [$\mu$A] | Deposition rate [%] |
|---|---|---|
| 3 | 1.5 | 86 |

3.5 Properties In Printing Inks 3.5.1 NC (nitrocellulose) printing

The test is carried out in accordance with the test procedure from Pigments Marketing, Hoechst AG "NC-Tiefdruck" [NC intaglio printing], issue 7/94 (No. 3/3) in the mixtures A and B (transparent and hiding).

In relation to the standard given in the comparison example (100%, Novoperm-Gelb P-HG), the following values were determined:

Color strength: 110%
Hue: 3 greener
Cleanness: 3 cleaner
Transparency: 4 more transparent
Gloss: 4 more glossy

3.6 Properties In Plastics 3.6.1 PVC (polyvinyl chloride)

Testing in flexible and rigid PVC is carried out with reference to DIN 53775 in accordance with the test procedures from Pigments Marketing, Hoechst AG "Prüfung in Weich PVC" [Testing in flexible PVC] (issue 7/93, No. 4/3) and "Prüfung in Hart-PVC" [Testing in rigid PVC] (issue 4/87, No. 4/4).

In relation to the standard indicated in the comparison example (100%, Novoperm-Gelb P-HG), the following values were determined at an incorporation temperature of 130° C. and 160° C.;

Color strength: 112%
Hue: 3 greener
Cleanness: 2 cleaner
Transparency: 3–4 more transparent
Bleeding fastness: unchanged
Dispersibility: unchanged 3.6.2 Polyolefin (polyethylene)

Testing in polyethylene is carried out in accordance with the test procedure from Pigments Marketing, Hoechst AG "Coloristische Prüfung von Farbmitteln in thermoplastischen Kunststoffen" [Color testing of colorants in thermoplastics] (issue 4/93, No. 4/12) and "Prüfung von Farbmitteln auf ihre Hitzebeständigkeit in thermoplastischen Kunststoffen im SpritzgieBverfahren nach DIN 53722" [Testing of colorants for their heat stability in injection-molded thermoplastics in accordance with DIN 53722] (issue 3/94, No. 4/13) in ®Hostalen GC 7260.

In relation to the standard indicated in the comparison example (100%, Novoperm-Gelb P-HG), the following values were found:

Color strength: 114%
Temperature resistance: 290° C. (Standard from comparison example: 290° C.)

EXAMPLE 4

4.1 Pigment Synthesis

The procedure of Example 3 is followed with the modification that the final solvent treatment of the prepigment is carried out in water/isobutanol at about 90° C. for 2 hours.

4.2 Pigment Characterization

BET surface area: 76 m$^2$/g
Residual moisture content: 0.6% H$_2$O (Karl-Fischer)
Residual salt content: 0.12 mS/cm
pH: 7.0
Thermal stability: (DTA, as in Ex. 1.2. Beginning of decomposition about 350° C., maximum decomposition about 355° C.).
Particle size and morphology (mass distribution counted by electron microscopy)
Particle size: $d_{50}$=119 nm; $d_{10}$=73 nm; $d_{95}$=185 nm.
Particle morphology:
The length/width ratio was determined as 1.48:1. The micrographs show approximately cuboid particles (no pronounced acicular form as in the comparison).
X-ray diffraction data:

| 2 theta | Relative intensity % | Width at half peak height |
|---|---|---|
| 25.5 | 100 | 0.78 |
| 13.4 | 87 | 0.91 |
| 6.6 | 60 | 0.78 |
| 9.5 | 49 | 0.59 |
| 19.4 | 38 | 1.3 |
| 28.3 | 23 | 1.3 |
| 17.5 | 19 | 1.0 | and a few other small bands and shoulders.
Dielectric characteristics:
$\Omega$.cm: $10^{12}$
$\epsilon$: 4.6 (1 kHz)
tan $\delta$: 4×10$^{-2}$ (1 kHz)

4.3 Transparency

The transparency is measured as described in Example 1.3 and determined at about 3 more transparent.

4.4 Electrostatic Properties 4.4.1 5 parts of the pigment from Example 4.1 are incorporated as described in Example 1.4 into a toner binder, and measurements are carried out. As a function of the activation period, the following q/m values [$\mu$C/g] are measured:

| Activation period | Charge q/m [$\mu$C/g] |
|---|---|
| 10 min | +1 |
| 30 min | 0 |
| 2 h | −4 |
| 24 h | −6 |

4.4.2 5 parts of the pigment and 1 part of the charge control agent described in U.S. Pat. No. 5,378,571, Example 5, of the formula

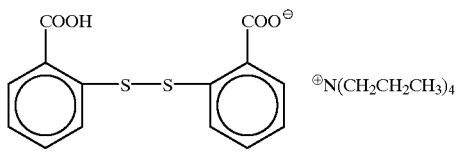

are incorporated as described in Example 1.4 into a toner binder, and measurements are carried out. As a function of the activation period, the following q/m values [µC/g] are measured:

| Activation period | Charge q/m [µC/g] |
|---|---|
| 10 min | +4 |
| 30 min | +1 |
| 2 h | −2 |
| 24 h | +1 |

4.4.3 5 parts of the pigment and 1 part of the charge control agent described in DE-A-39 01 153, Preparation Example 1 (highly fluorinated ammonium salt), of the formula

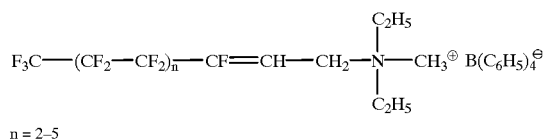

n = 2–5 are incorporated as described in Example 1.4.1 into a toner binder, and measurements are carried out. As a function of the activation period, the following q/m values [µC/g] are measured:

| Activation period | Charge q/m [µC/g] |
|---|---|
| 10 min | −16 |
| 30 min | −16 |
| 2 h | −18 |
| 24 h | −16 |

4.4.4 5 parts of the pigment and 1 part of the charge control agent described in U.S. Pat. No. 5,187,038, Preparation Example 2 (cationic polymer), of the formula

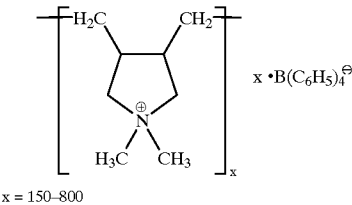

x = 150–800 are incorporated as described in Example 1.4 into a toner binder, and measurements are carried out. As a function of the activation period, the following q/m values [µC/g] are measured:

| Activation period | Charge q/m [µC/g] |
|---|---|
| 10 min | −8 |
| 30 min | −9 |
| 2 h | −9 |
| 24 h | −7 |

4.4.5 5 parts of the pigment and 1 part of the charge control agent described in European Patent Application EP-A2-0 664 463, Preparation Example 1.2.4 (polyester salt), are incorporated as described in Example 1.4 into a toner binder, and measurements are carried out. As a function of the activation period, the following q/m values [µC/g] are measured:

| Activation period | Charge q/m [µC/g] |
|---|---|
| 10 min | −11 |
| 30 min | −12 |
| 2 h | −11 |
| 24 h | −9 |

4.4.6 5 parts of the pigment from Preparation Example 4.1 are homogeneously incorporated as described in Example 1.4 into 95 parts of a powder coating binder based on a TGIC polyester, e.g. ®Uralac P 5020 (DSM, Netherlands). In order to determine the deposition rate, 30 g of the test powder coating are sprayed at a defined pressure through a triboelectric gun. By differential weighing, the quantity of powder coating deposited can be determined, and a deposition rate in % can be defined, and a current flow (µA) can be derived from the charge transfer.

| Pressure [bar] | Current [µA] | Deposition rate [%] |
|---|---|---|
| 3 | 1.7 | 88 |

4.4.7 5 parts of the pigment from Preparation Example 4.1 and 1 part of ®Bontron E 89, Orient Chemicals, Japan (calixarene compound) are incorporated as described in Example 1.4 into a toner binder, and measurements are carried out. As a function of the activation period, the following q/m values [µC/g] are measured:

| Activation period | Charge q/m [µC/g] |
|---|---|
| 10 min | −21 |
| 30 min | −12 |
| 2 h | −15 |
| 24 h | −16 |

4.4.8 5 parts of the pigment from Preparation Example 4.1 and 1 part of ®Bontron E 84, Orient Chemicals, Japan (zinc salicylate compound) are incorporated as described in Example 1.4 into a polyester toner binder, and measurements are carried out. As a function of the activation period, the following q/m values [µC/g] are measured:

| Activation period | Charge q/m [$\mu$C/g] |
|---|---|
| 10 min | −9 |
| 30 min | −17 |
| 2 h | −15 |
| 24 h | −15 |

4.4.9 5 parts of the pigment from Preparation Example 4.1 and 1 part of the charge control agent described in DE-A-44 18 842, Use Example 2 ($\beta$-cyclodextrin), of the formula

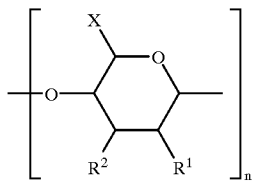

$R^1$ = OH
$R^2$ = O
n = 7 are incorporated as described in Example 1.4 into a polyester toner binder, and measurements are carried out. As a function of the activation period, the following q/m values [$\mu$C/g] are measured:

| Activation period | Charge q/m [$\mu$C/g] |
|---|---|
| 10 min | −17 |
| 30 min | −18 |
| 2 h | −20 |
| 24 h | −19 |

EXAMPLE 5

5.1 Pigment Synthesis

The procedure of Example 1 is followed but the precipitation of the acetolone is carried out without addition of dimethylcocoalkylamine oxide.

5.2 Pigment Characteristics

BET surface area: 75 m²/g
Residual moisture content: 0.6%
Residual salt content: 0.1 mS/cm
pH: 7
Thermal stability: beginning of decomposition about 350° C., maximum decomposition about 355° C. (DTA, 3° C./min heating rate; closed glass ampule)

Comparison Example

The comparison used was commercially available Pigment Yellow 180 (®Novoperm-Gelb P-HG; Hoechst AG)
Pigment characterization:
BET surface area: 44 m²/g
Residual moisture content: 0.5% (Karl-Fischer)
Residual salt content: 0.2 mS/cm
pH: 6.9
Thermal stability: beginning of decomposition about 350° C., maximum decomposition about 365° C. (DTA, as in Ex. 1.2)

Particle size: $d_{50}$=141 nm; $d_{10}$=87 nm; $d_{95}$=245 nm.
Particle morphology
The length/width ratio was determined as 2.07:1.
The particles exhibit a pronounced acicular shape.
X-ray diffraction diagram:

| 2 theta | Relative intensity % | Width at half peak height |
|---|---|---|
| 25.5 | 100 | 0.67 |
| 13.4 | 86 | 0.54 |
| 6.6 | 61 | 0.58 |
| 9.5 | 50 | 0.50 |
| 19.4 | 50 | 1.07 |
| 17.4 | 21 | 0.79 |
| 28.3 | 19 | 0.72 | and some other small bands and shoulders.
Dielectric characteristics:
$\Omega$.cm: $2 \times 10^{10}$
$\epsilon$: 4.3
tan $\delta$: $11 \times 10^{-2}$

Electrostatic Properties

EXAMPLE A 5 parts of the comparison pigment are incorporated as described in Example 1.4 into a toner binder, and measurements are carried out. As a function of the activation period, the following q/m values [$\mu$C/g] are measured:

| Activation period | Charge q/m [$\mu$C/g] |
|---|---|
| 10 min | −10 |
| 30 min | −12 |
| 2 h | −20 |
| 24 h | −19 |

EXAMPLE B 5 parts of the comparison pigment are incorporated as described in Example 1.4 into a toner binder (the toner binder used being, instead of the polyester resin, a 60:40 styrene-acrylate copolymer, e.g. Dialec S 309), and measurements are carried out. As a function of the activation period, the following q/m values [$\mu$C/g] are measured:

| Activation period | Charge q/m [$\mu$C/g] |
|---|---|
| 10 min | −17 |
| 30 min | −23 |
| 2 h | −24 |
| 24 h | −24 |

EXAMPLE C 5 parts of the comparison pigment and 1 part of the charge control agent described U.S. Pat. No. 5,378,571, Example 5, of the formula

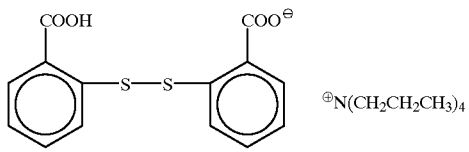

are incorporated as described in Example 1.4 into the toner binder Dialec S 309, and measurements are carried out. As a function of the activation period, the following q/m values [μC/g] are measured:

| Activation period | Charge q/m [μC/g] |
|---|---|
| 10 min | +2 |
| 30 min | +1 |
| 2 h | −4 |
| 24 h | −4 |

What is claimed is:

1. A powder consisting essentially of an acrylic resin or polyester resin which contains epoxide, carboxyl or hydroxyl groups, or a combination of these resins, from 0.5 to 5% by weight of the azo pigment of the formula (1)

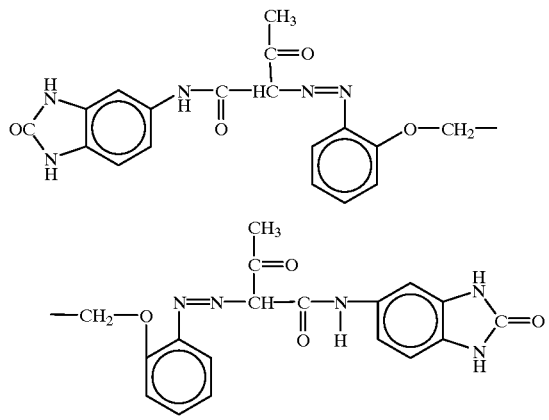

(I)

which has a specific surface area of the pigment powder of 60 to 78 m$^2$/g and from 1 to 5% by weight of a charge control agent selected from the group consisting of the triphenylmethanes; ammonium compounds; iminium compounds; fluorinated ammonium compounds and iminium compounds; biscationic acid amides; polymeric ammonium compounds; diallylammonium compounds; aryl sulfide derivatives; phenol derivatives; phosphonium compounds and fluorinated phosphonium compounds; calixarenes; cyclically linked oligosaccharides; polyester salts; metal complex compounds; benzimidazolones; azines, thiazines and oxazines.

2. An electrophotographic toner consisting essentially of a toner binder, from 0.1 to 50% by weight of an azo pigment of the formula (1)

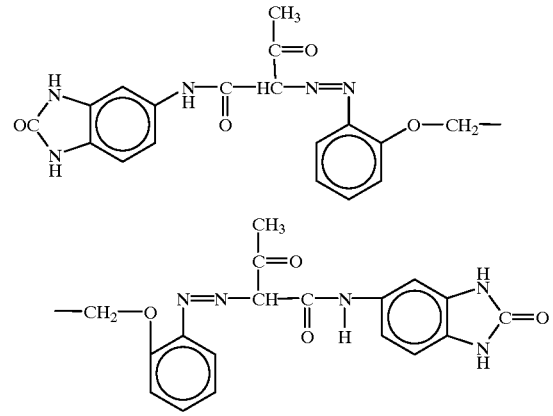

(I)

which has a specific surface area of 60 to 78 m$^2$/g and from 0.01 to 20% by weight of a charge control agent selected from the group consisting of the triphenylmethanes; ammonium compounds; immonium compounds; fluorinated ammonium compounds; fluorinated immonium compounds; biscationic acid amides; polymeric ammonium compounds; diallylammonium compounds; aryl sulfide derivatives; phenol derivatives, phosphonium compounds, fluorinated phosphonium compounds; calixarenes, cyclically linked oligosaccharides; polyester salts; metal complex compounds; benzimidazolones; azines, thiazines and oxazines.

3. A process for the preparation of an electrophotographic toner as claimed in claim 2, wherein the azo pigment, the charge control agent and the toner binder are homogeneously mixed together.

4. An electrophotographic toner as claimed in claim 2, wherein the cyclically linked oligosaccharides are cyclodextrins.

5. An electrophotographic toner as claimed in claim 2, wherein the azo pigment is present in an amount of from 0.5 to 20% by weight, and the charge control agent is present in an amount of from 0.1 to 5% by weight.

6. An electrophotographic toner as claimed in claim 2, wherein the azo pigment consists of particles having a length/width ratio of less than 1.6:1.

7. An electrophotographic toner as claimed in claim 2, wherein the charge control agent is a compound of the formula (17)

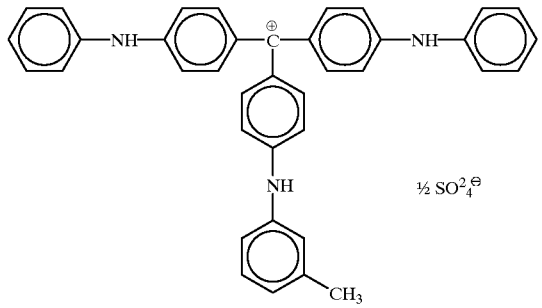

(17)

or a compound of the formula (3)

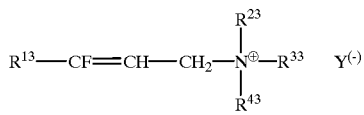
(3)

in which $R^{13}$ is perfluorinated alkyl having 5 to 11 carbon atoms, $R^{23}$, $R^{33}$ and $R^{43}$ are identical or different and are $C_1$–$C_5$-alkyl, and $Y^-$ is a tetrafluoroborate or tetraphenylborate anion; or a compound of the formula (5)

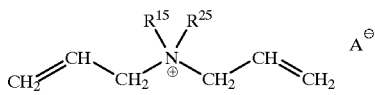
(5)

in which $R^{15}$ and $R^{25}$ are each methyl, $A^\ominus$ is a tetraphenylborate anion or a compound of formula (6)

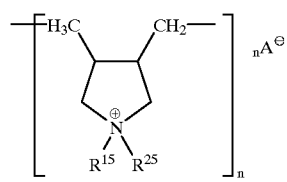
(6)

in which $R^{15}$ and $R^{25}$ are each methyl, $A^\ominus$ is a tetraphenylborate anion and n has a value which corresponds to molecular weights of from 5000 to 500,000 g/mol;

or a compound of the formula (7)

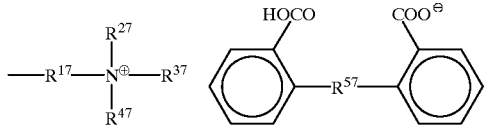
(7)

in which $R^{17}$, $R^{27}$, $R^{37}$ and $R^{47}$ are identical or different and are $C_1$–$C_5$-alkyl radicals and $R^{57}$ is a divalent radical —S—, —S—S—, —SO— or —SO$_2$—; or a compound of the formula (13)

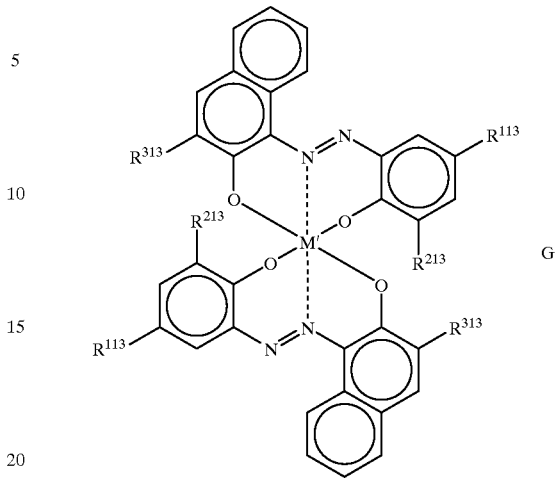
(13)

in which $R^{113}$ is chlorine, $R^{213}$ and $R^{313}$ are hydrogen, M' is chromium, cobalt or iron, and G is one or two protons; or a polymer salt whose anionic component is a polyester comprising the reaction product of the individual components a), b) and c) and, optionally d) and e), where
  a) is a dicarboxylic acid or a reactive derivative of a dicarboxylic acid, which is free from sulfo groups,
  b) is a difunctional aromatic, aliphatic or cycloaliphatic sulfo compound whose functional groups are hydroxyl or carboxyl or hydroxyl and carboxyl,
  c) is an aliphatic, cycloaliphatic or aromatic diol, a polyether diol or a polycarbonate diol,
  d) is a polyfunctional compound having a functionality>2 whose functional groups are hydroxyl or carboxyl or hydroxyl and carboxyl, and
  e) is a monocarboxylic acid, and whose cationic component comprises hydrogen atoms or metal cations;
or a compound of the formula (16)

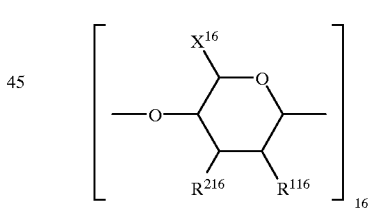
(16)

in which $n^{16}$ is a number between 3 and 100, $R^{116}$ and $R^{216}$ are identical or different and are OH or $OR^{316}$, where $R^{316}$ is substituted or unsubstituted $C_1$–$C_{18}$-alkyl, $C_6$–$C_{12}$-aryl or tosyl, and $X^{16}$ is $CH_2OH$ or $CH_2COR^{316}$.

8. An electrophotographic toner as claimed in claim 2, wherein the azo pigment has a specific surface area from 62 to 78 m$^2$/g.

9. A powder consisting essentially of an acrylic resin or polyester resin which contains epoxide, carboxyl or hydroxyl groups, or a combination of these resins, from 0.1 to 50% by weight of an azo pigment of the formula (1)

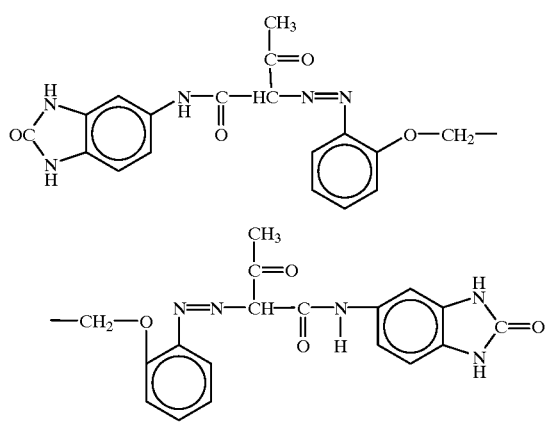
(I)

which has a specific surface area of 60 to 78 m²/g and from 0.01 to 20% by weight of a charge control agent selected from the group consisting of the triphenylmethanes; ammonium compounds; immonium compounds; fluorinated ammonium compounds; fluorinated immonium compounds; biscationic acid amides; polymeric ammonium compounds; diallylammonium compounds; aryl sulfide derivatives; phenol derivatives, phosphonium compound; fluorinated phosphonium compounds; calixarenes, cyclically linked oligosaccharides; polyester salts; metal complex compounds; benzimidazo lones; azines; thiazines and oxazines.

10. A process for the preparation of a powder as claimed in claim 9, wherein the azo pigment, the charge control agent and the resin are homogeneously mixed together.

11. A powder as claimed in claim 9, wherein the cyclically linked oligosaccharides are cyclodextrins.

12. A powder as claimed in claim 9, wherein the azo pigment is present in an amount of from 0.5 to 5% by weight, and the charge control agent is present in an amount of from 1 to 5% by weight.

13. A powder as claimed in claim 9, wherein the azo pigment consists of particles having a length/width ratio of less than 1.6:1.

14. A powder as claimed in claim 9, wherein the charge control agent is a compound of the formula (17)

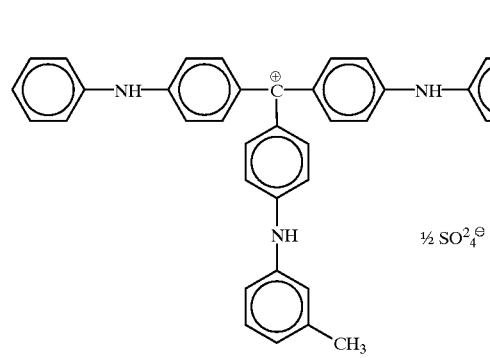
(17)

or a compound of the formula (3)

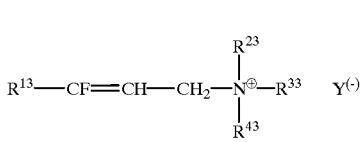
(3)

in which $R^{13}$ is perfluorinated alkyl having 5 to 11 carbon atoms, $R^{23}$, $R^{33}$ and $R^{43}$ are identical or different and are $C_1$–$C_5$-alkyl, and $Y^-$ is a tetrafluoroborate or tetraphenylborate anion; or a compound of the formula (5)

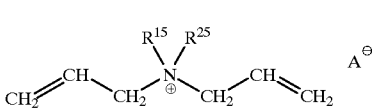
(5)

in which $R^{15}$ and $R^{25}$ are each methyl and $A^{\ominus}$ is a tetraphenylborate anion;

or a compound of the formula (6)

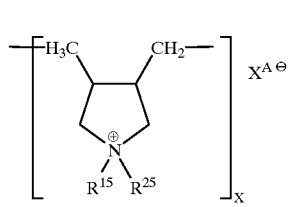
(6)

in which $R^{15}$ and $R^{25}$ are each methyl, $A^{\ominus}$ is a tetraphenylborate anion and x is a number from 150–800;

or a compound of the formula (7)

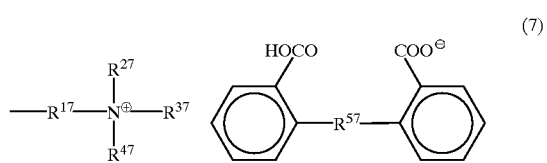
(7)

in which $R^{17}$, $R^{27}$, $R^{37}$ and $R^{47}$ are identical or different and are $C_1$–$C_5$-alkyl radicals and $R^{57}$ is a divalent radical —S—, —S—S—, —SO— or —SO$_2$—;

or a compound of the formula (13)

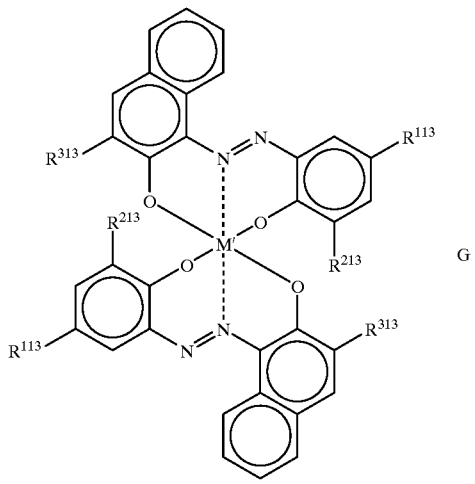

in which $R^{113}$ is chlorine, $R^{213}$ and $R^{313}$ are hydrogen, M' is chromium, cobalt or iron, and G is one or two protons;

or a polymer salt whose anionic component is a polyester, comprising the reaction product of the individual components a), b) and c) and optionally d) and e), where a) is a dicarboxylic acid or a reactive derivative of a dicarboxylic acid, which is free from sulfo groups, b) is a difunctional aromatic, aliphatic or cycloaliphatic sulfo compound whose functional groups are (i) hydroxyl, (ii) carboxyl or (iii) hydroxy and carboxy, c) is an aliphatic, cycloaliphatic or aromatic diol, a polyether diol or a polycarbonate diol, d) is a polyfunctional compound having a functionality of >2 whose functional groups are (i) hydroxyl, (ii) carboxyl or (iii) hydroxy and carboxy, and e) is a monocarboxylic acid, and whose cationic component comprises hydrogen atoms or metal cations or a compound of the formula (16)

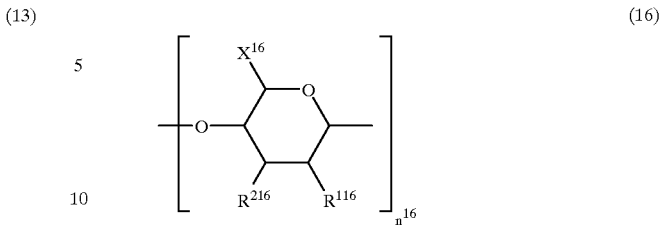

in which $n^{16}$ is a number between 3 and 100, $R^{116}$ and $R^{216}$ are identical or different and are OH or $OR^{316}$, where $R^{316}$ is substituted or unsubstituted $C_1$–$C_{18}$-alkyl, $C_6$–$C_{12}$-aryl or tosyl, and $X^{16}$ is $CH_2OH$ or $CH_2COR^{316}$.

15. A powder consisting of a binder and from 0.1 to 50% by weight of an azo pigment of the formula (I)

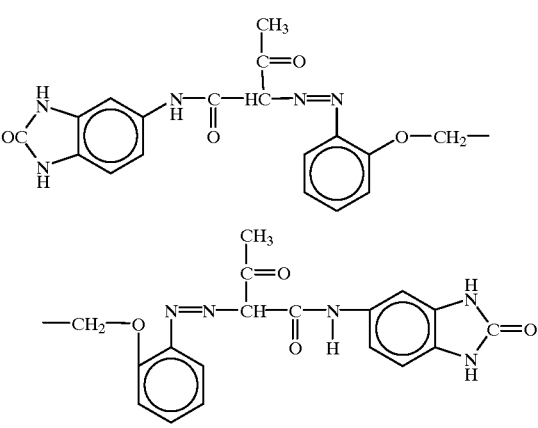

which has a specific surface area of 60 to 78 m²/g.

16. The powder as claimed in claim 15, wherein the azo pigment consists of particles having a length/width ratio of less than 1.6:1.

17. The powder as claimed in claim 15, wherein the surface area of azo pigment is from 62 to 78 m²/g.

18. The powder as claimed in claim 15, wherein the binder is a styrene-acrylate resin, polyester resin, acrylic resin or a polyester resin which contains epoxide, carboxyl or hydroxyl groups.

19. The powder as claimed in claim 15, containing from 0.5 to 20% by weight of the azo pigment.

* * * * *